US012807091B2

(12) United States Patent
Ohno et al.

(10) Patent No.: US 12,807,091 B2
(45) Date of Patent: Nov. 24, 2026

(54) AIRBAG CONTROL DEVICE, AIRBAG CONTROL METHOD, AND NON-TRANSITORY STORAGE MEDIUM

(71) Applicants: TOYOTA JIDOSHA KABUSHIKI KAISHA, Toyota (JP); TOYODA GOSEI CO., LTD., Kiyosu (JP)

(72) Inventors: Mitsuyoshi Ohno, Miyoshi (JP); Katsuya Shimazu, Toyota (JP); Kenji Kakimoto, Kiyosu (JP)

(73) Assignees: TOYOTA JIDOSHA KABUSHIKI KAISHA, Toyota (JP); TOYODA GOSEI CO., LTD., Kiyosu (JP)

( * ) Notice: Subject to any disclaimer, the term of this patent is extended or adjusted under 35 U.S.C. 154(b) by 153 days.

(21) Appl. No.: 18/972,156

(22) Filed: Dec. 6, 2024

(65) Prior Publication Data

US 2025/0214525 A1 Jul. 3, 2025

(30) Foreign Application Priority Data

Dec. 27, 2023 (JP) ................................. 2023-221740

(51) Int. Cl.
*B60R 21/015* (2006.01)
*B60R 21/01* (2006.01)
(Continued)

(52) U.S. Cl.
CPC ........ *B60R 21/01546* (2014.10); *B60R 21/01* (2013.01); *B60R 21/015* (2013.01);
(Continued)

(58) Field of Classification Search
CPC . B60R 21/01546; B60R 21/01; B60R 21/015; B60R 21/16; B60R 21/18; B60R 22/48; B60R 21/01538; B60R 21/01544; B60R 21/01556; B60R 2021/01211; B60R 2021/01286; B60R 2022/4816; G06V 10/14; G06V 20/59
See application file for complete search history.

(56) References Cited

U.S. PATENT DOCUMENTS 5,871,230 A * 2/1999 Lewis ..................... B60R 22/14 280/743.1
6,378,898 B1 * 4/2002 Lewis ..................... B60R 21/18 280/739
(Continued)

FOREIGN PATENT DOCUMENTS

DE 10 2014 217 808 A1 3/2015
DE 11 2022 002 443 T5 5/2024
(Continued)

*Primary Examiner* — Lindsay M Low
*Assistant Examiner* — Susan E Scharpf
(74) *Attorney, Agent, or Firm* — Sughrue Mion, PLLC

(57) ABSTRACT

An airbag control device includes a memory, and a processor coupled to the memory. The processor is configured to determine at least one of propriety of deploying an airbag or propriety of warning a seated passenger according to appearance of a first pattern in an image, captured of a range including a cover having the first pattern provided on at least a front surface side and covering the airbag provided in a packed state at a section of a seatbelt and covering the section of the seatbelt together with the airbag.

12 Claims, 11 Drawing Sheets

(51) Int. Cl.

| | |
|---|---|
| ***B60R 21/16*** | (2006.01) |
| ***B60R 21/18*** | (2006.01) |
| ***B60R 22/48*** | (2006.01) |
| ***G06V 10/14*** | (2022.01) |
| ***G06V 20/59*** | (2022.01) |

(52) U.S. Cl.
CPC .............. *B60R 21/16* (2013.01); *B60R 21/18* (2013.01); *B60R 22/48* (2013.01); *G06V 10/14* (2022.01); *G06V 20/59* (2022.01); *B60R 2021/01211* (2013.01); *B60R 2021/01286* (2013.01); *B60R 21/01538* (2014.10); *B60R 21/01544* (2014.10); *B60R 21/01556* (2014.10); *B60R 2022/4816* (2013.01)

(56) References Cited

U.S. PATENT DOCUMENTS

| | | | | |
|---|---|---|---|---|
| 6,452,870 | B1 * | 9/2002 | Breed | B60R 21/0152 367/99 |
| 7,980,590 | B2 * | 7/2011 | Foubert | B60R 21/18 280/801.1 |
| 8,585,084 | B1 * | 11/2013 | Schneider | B60R 21/18 280/743.2 |
| 10,137,856 | B1 * | 11/2018 | Jimenez | B60R 21/01544 |
| 2015/0069741 | A1 | 3/2015 | Shimazu | |
| 2017/0225788 | A1 * | 8/2017 | Humbert | B60R 21/233 |
| 2017/0349130 | A1 * | 12/2017 | Faruque | B60R 21/18 |
| 2019/0023214 | A1 * | 1/2019 | Kitagawa | B60R 21/01534 |
| 2020/0094763 | A1 * | 3/2020 | Nakamura | B60R 21/01538 |
| 2020/0122668 | A1 | 4/2020 | Ozaki et al. | |
| 2021/0094504 | A1 * | 4/2021 | Tanaka | B60R 21/2338 |
| 2021/0122316 | A1 | 4/2021 | Freisler et al. | |
| 2022/0250570 | A1 * | 8/2022 | Yilmaz | B60R 21/015 |
| 2022/0355755 | A1 | 11/2022 | Fischer et al. | |
| 2023/0103417 | A1 | 4/2023 | Matsuzaki et al. | |

FOREIGN PATENT DOCUMENTS

| | | | |
|---|---|---|---|
| JP | 2007-055294 | A | 3/2007 |
| JP | 2016-224633 | A | 12/2016 |
| JP | 2017-056877 | A | 3/2017 |
| JP | 2020-066425 | A | 4/2020 |
| JP | 2023-049380 | A | 4/2023 |
| WO | 2019/105959 | A1 | 6/2019 |

* cited by examiner

AIRBAG CONTROL DEVICE, AIRBAG CONTROL METHOD, AND NON-TRANSITORY STORAGE MEDIUM

CROSS-REFERENCE TO RELATED APPLICATION

This application is based on and claims priority under 35 USC 119 from Japanese Patent Application No. 2023-221740 filed on Dec. 27, 2023, the disclosure of which is incorporated by reference herein.

BACKGROUND

Technical Field

The present disclosure relates to an airbag control device, an airbag control method, and a non-transitory storage medium.

Related Art

For example, a passenger protection device described in Japanese Patent Application Laid-Open (JP-A) No. 2020-066425 includes a packed lap belt airbag housed inside a lap belt section of a seatbelt, with the lap belt airbag caused to expand during a vehicle collision to protect a passenger seated in a seat (see FIG. 1 to FIG. 5, FIG. 9, FIG. 10 and the like of JP-A No. 2020-066425).

Moreover, for example, in a passenger protection device described in JP-A No. 2023-049380 gas used for expansion is allowed to exhaust from an exhaust port when a child seat is fixed to a seat using a seatbelt that houses an airbag inside a lap belt section, thereby suppressing the airbag from projecting out.

In a case in which a seatbelt housing a lap belt airbag is employed to fix a child seat to a seat, there is a possibility that gas used for expansion during deployment of the lap belt airbag may not be exhausted fast enough if exhausting from an exhaust port alone as in JP-A No. 2023-049380.

There is accordingly a concern in JP-A No. 2020-066425 and JP-A No. 2023-049380 regarding a child seat being sent flying or being damaged during deployment of the lap belt airbag, and a concern that release or the like of gas used for expansion may not be sufficiently prevented due to the airbag rupturing. Moreover, in a case in which an object such as a personal computer (PC) is placed on the knees (femur area) of a passenger wearing a seatbelt there is also a possibility of the placed object being sent flying or being damaged during deployment of the lap belt airbag.

The present disclosure obtains an airbag control device, an airbag control method, and a non-transitory storage medium that are each capable of suppressing the occurrence of a malfunction such as an object being sent flying during deployment of an airbag by implementation using a simple configuration.

SUMMARY

An airbag control device according to a first aspect includes a control section that determines at least one of propriety of deploying an airbag or propriety of warning a seated passenger according to appearance of a first pattern in an image, captured by an imaging section for capturing a range including a cover having the first pattern provided on at least a front surface side and covering the airbag provided in a packed state at a section of a seatbelt and covering the section of the seatbelt together with the airbag.

In the first aspect, "front surface side of a section of the seatbelt" means a side out of front-back surfaces of the section of the seatbelt at the nearside when viewed from the imaging section in a state of the seatbelt being worn untwisted. Because a seatbelt is generally formed from a single piece of cloth, this makes it difficult to provide different patterns on the front surface and the back surface thereof, and so it is difficult to detect the orientation of the front-back surfaces of the seatbelt (airbag), twisting, or the like from an appearance of a pattern in an image captured by the imaging section. In contrast thereto, providing the first pattern on at least the front surface side of the cover of an airbag is easy, enabling accurate detection of the orientation of the front-back surfaces of the seatbelt (airbag), twisting, or the like from an appearance of the first pattern in an image captured by the imaging section.

Then in the first aspect, at least one of propriety of deploying an airbag or propriety of warning a seated passenger is determined according to an appearance of the first pattern in the image captured by the imaging section. This thereby enables determination of deployment of the airbag and no warning to the seated passenger in a case in which an appearance of the first pattern in the image is not an appearance corresponding, for example, to any of "child seat fixed by seatbelt", "twisting of seatbelt", or "object placed on knees of passenger". Moreover, an appearance of the first pattern in the image enables determination of no deployment of the airbag or warning the seated passenger in a case in which the appearance of the first pattern corresponds, for example, to any of "child seat fixed by seatbelt", "twisting of seatbelt", or "object placed on knees of passenger".

Note that cases in which no deployment of the airbag has been determined enables a child seat fixed by the seatbelt, or a placed object placed on the knees of the passenger, to be reliably prevented from being sent flying due to deployment of the airbag being prohibited. Moreover, cases in which warning the seated passenger has been determined enable a deployment behavior of the airbag to be made safe by, for example, twisting of the seatbelt to be eliminated by the passenger, the placed object on the knees of the passenger to be removed. The first aspect is accordingly capable of suppressing occurrence of a malfunction such as an object being sent flying or the like during deployment of an airbag by implementation using a simple configuration, without a need for a configuration capable of opening or closing an exhaust port of an airbag.

A second aspect is the first aspect, wherein the airbag is a lap belt airbag housed at an upper side of a lap belt section of the seatbelt, the cover is provided so as to cover the airbag and the lap belt section, and the first pattern is provided at an upper side surface of the cover.

In the second aspect, "upper side of a lap belt section" means the side from out of the front-back surfaces of the lap belt section of the seatbelt at the nearside when viewed from the imaging section in a state of the seatbelt being-worn untwisted. In the second aspect, whether or not any of "child seat fixed by seatbelt", "twisting of lap belt section", or "object placed on knees of passenger" applies can be easily determined from an appearance in the image of the first pattern provided at the upper side of the cover covering the lap belt airbag. Then in a case in which no deployment of the airbag has been determined, a child seat fixed by seatbelt, or a placed object placed on the knees of the passenger, can be reliably prevented from being sent flying due to deployment of the airbag being prohibited. Moreover, cases in which warning the seated passenger has been determined enable the deployment behavior of the airbag to be made safe such as, for example, by twisting of the lap belt section being eliminated by the passenger or the placed object on the knees of the passenger being removed.

A third aspect is the first aspect, wherein the airbag is a shoulder belt airbag housed at a front side of a shoulder belt section of the seatbelt, the cover is provided so as to cover the airbag and the shoulder belt section, and the first pattern is provided at a front side surface of the cover.

In the third aspect "front side of the shoulder belt section" means the side out of the front-back surfaces of the shoulder belt section of the seatbelt at the nearside when viewed from the imaging section in a state of the seatbelt being worn untwisted. In the third aspect, whether or not any corresponds from out of "child seat fixed by seatbelt", "twisting of shoulder belt section", or "object placed on knees of passenger" can be easily determined from an appearance of the first pattern provided at the front side of the cover covering the shoulder belt airbag in the image. Then in a case in which no deployment of the airbag has been determined, a child seat fixed by the seatbelt, or a placed object placed on the knees of the passenger, can be reliably prevented from being sent flying due to deployment of the airbag being prohibited. Moreover, cases in which warning to the seated passenger has been determined enable the deployment behavior of the airbag to be made safe such as by, for example, twisting of the lap belt section being eliminated by the passenger, or by the placed object on the knees of the passenger being removed.

A fourth aspect is any one of the first aspect to the third aspect, wherein the control section allows deployment of the airbag in a case in which a first predetermined period of time or greater continues from when a tongue member provided at the seatbelt engaged with a buckle and the first pattern is visible in the image, or in a case in which the first pattern is visible in the image during travel of a vehicle.

Not "child seat fixed by seatbelt" can be determined in a case in which the first predetermined period of time or greater continues from when a tongue member provided at the seatbelt engaged with a buckle and the first pattern is visible in the image, and cases in which the first pattern is visible in the image during travel of the vehicle. In the fourth aspect, deployment of the airbag is allowed in such cases, and so the airbag (for example the lap belt airbag or the shoulder belt airbag) is deployed during a vehicle collision needing deployment of the airbag, enabling the seated passenger to be appropriately protected by the deployed airbag.

A fifth aspect is the fourth aspect, wherein the control section prohibits deployment of the airbag in a case in which a second predetermined period of time or greater continues from when the tongue member provided at the seatbelt engaged with the buckle and the first pattern is not visible in the image.

"Child seat fixed by seatbelt" or "twisting of seatbelt" can be determined in a case in which the second predetermined period of time or greater continues from when the tongue member provided at the seatbelt engaged with the buckle and the first pattern is not visible in the image. In the fifth aspect, deployment of the airbag (for example the lap belt airbag or the shoulder belt airbag) is prohibited in such cases, enabling the child seat to be reliably prevented from being sent flying due to deployment of the airbag or the like.

A sixth aspect is the fifth aspect, wherein the control section warns the seated passenger in a case in which the second predetermined period of time or greater continues from when the tongue member provided at the seatbelt engaged with the buckle and the first pattern is not visible in the image that is also a case in which a load detected prior to the tongue member being engaged with the buckle as detected by a seating sensor for detecting loads on a seating face of the seat provided with the seatbelt is a load less that is than a threshold value.

The occurrence of "twisting of seatbelt" can be determined in a case in which the second predetermined period of time or greater continues from when the tongue member provided at the seatbelt engaged with the buckle and the first pattern is not visible in the image and that is also a case in which the load detected prior to the tongue member being engaged with the buckle as detected by the seating sensor for detecting loads on the seating face of the seat provided with the seatbelt is a load that is less than the threshold value. In the sixth aspect, a warning to the seated passenger is given in such cases, enabling the deployment behavior of the airbag to be made safe by twisting of the seatbelt being eliminated by the passenger.

A seventh aspect is the fourth aspect, wherein the control section performs at least one of prohibiting deployment of the airbag or warning the seated passenger in a case in which the first pattern is no longer visible in the image after elapse of a third predetermined period of time or greater from when the tongue member provided at the seatbelt engaged with the buckle, or in a case in which a state of the first pattern not being visible in the image during travel of the vehicle has continued for a fourth predetermined period of time or greater.

"Object placed on knees of passenger" can be determined in a case in which the first pattern is no longer visible in the image after elapse of the third predetermined period of time or greater from when the tongue member provided at the seatbelt engaged with the buckle, or in a case in which a state of the first pattern not being visible in the image during travel of the vehicle has continued for the fourth predetermined period of time or greater. In the seventh aspect, in such cases at least one is performed out of prohibiting deployment of the airbag or warning the seated passenger. When deployment of the airbag has been prohibited a placed object can be reliably prevented from being sent flying or the like due to deployment of the airbag, and when the seated passenger has been warned a deployable condition of the airbag can be achieved by the object placed on the knees of the passenger being removed by the passenger.

An eighth aspect is the second aspect, wherein a second pattern different from the first pattern is provided at a lower side of the cover, and the control section prohibits deployment of the lap belt airbag in a case in which the second pattern is visible in the image.

In the eighth aspect, "lower side of the cover" means the side out of the front-back surfaces of the lap belt section at the far side when viewed from the imaging section in a state of the seatbelt being worn untwisted. In the eighth aspect, deployment of the lap belt airbag is prohibited in a case in which the second pattern provided at the lower side of the cover is visible in the image. This thereby enables the child seat or a placed object to be reliably prevented from being sent flying due to deployment of the lap belt airbag.

A ninth aspect is the third aspect, wherein a second pattern different from the first pattern is provided at a rear side of the cover, and the control section prohibits deployment of the shoulder belt airbag in a case in which the second pattern is visible in the image.

In the ninth aspect, "rear side of the cover" means the side out of the front-back surfaces of the shoulder belt section at the far side when viewed from the imaging section in a state of the seatbelt being worn untwisted. In the ninth aspect, deployment of the shoulder belt airbag is prohibited in a case in which the second pattern provided at the rear side of the cover is visible in the image. This thereby enables a child seat or placed object to be reliably prevented from being sent flying due to deployment of the shoulder belt airbag.

A tenth aspect is the first aspect, wherein the imaging section is an infrared camera, and the first pattern is a pattern combining a first portion with a second portion having a higher infrared reflectivity than the first portion.

In the tenth aspect, with the imaging section being the infrared camera, the first pattern is the pattern combining the first portion and the second portion having different infrared reflectivities. This thereby enables the first pattern to be a pattern not able to be distinguished by the naked eye, and enabling the visibility of the cover provided with the first pattern to be raised. Moreover, providing the first pattern to the cover is easy, and the first pattern is able to be reliably distinguished in the infrared image.

An airbag control method according to an eleventh aspect is processing executed by a computer. The processing includes determining at least one of propriety of deploying an airbag or propriety of warning a seated passenger according to appearance of a first pattern in an image, captured by an imaging section for capturing a range including a cover having the first pattern provided on at least a front surface side and covering the airbag provided in a packed state at a section of a seatbelt and covering the section of the seatbelt together with the airbag.

The eleventh aspect, similarly to the first aspect, enables suppression of an occurrence of a malfunction such as an object being sent flying or the like during deployment of an airbag by implementation using a simple configuration.

An airbag control program according to a twelfth aspect causes processing to be executed by a computer. The processing includes determining at least one of propriety of deploying an airbag or propriety of warning a seated passenger according to appearance of a first pattern in an image, captured by an imaging section for capturing a range including a cover having the first pattern provided on at least a front surface side and covering the airbag provided in a packed state at a section of a seatbelt and covering the section of the seatbelt together with the airbag.

The twelfth aspect, similarly to the first aspect, enables suppression of an occurrence of a malfunction such as an object being sent flying or the like during deployment of an airbag by implementation using a simple configuration.

The present disclosure exhibits the advantageous effect of enabling suppression of an occurrence of a malfunction such as an object being sent flying or the like during deployment of an airbag by implementation using a simple configuration.

BRIEF DESCRIPTION OF THE DRAWINGS

Exemplary embodiments of the present invention will be described in detail based on the following figures, wherein.

DETAILED DESCRIPTION

Figure 1:
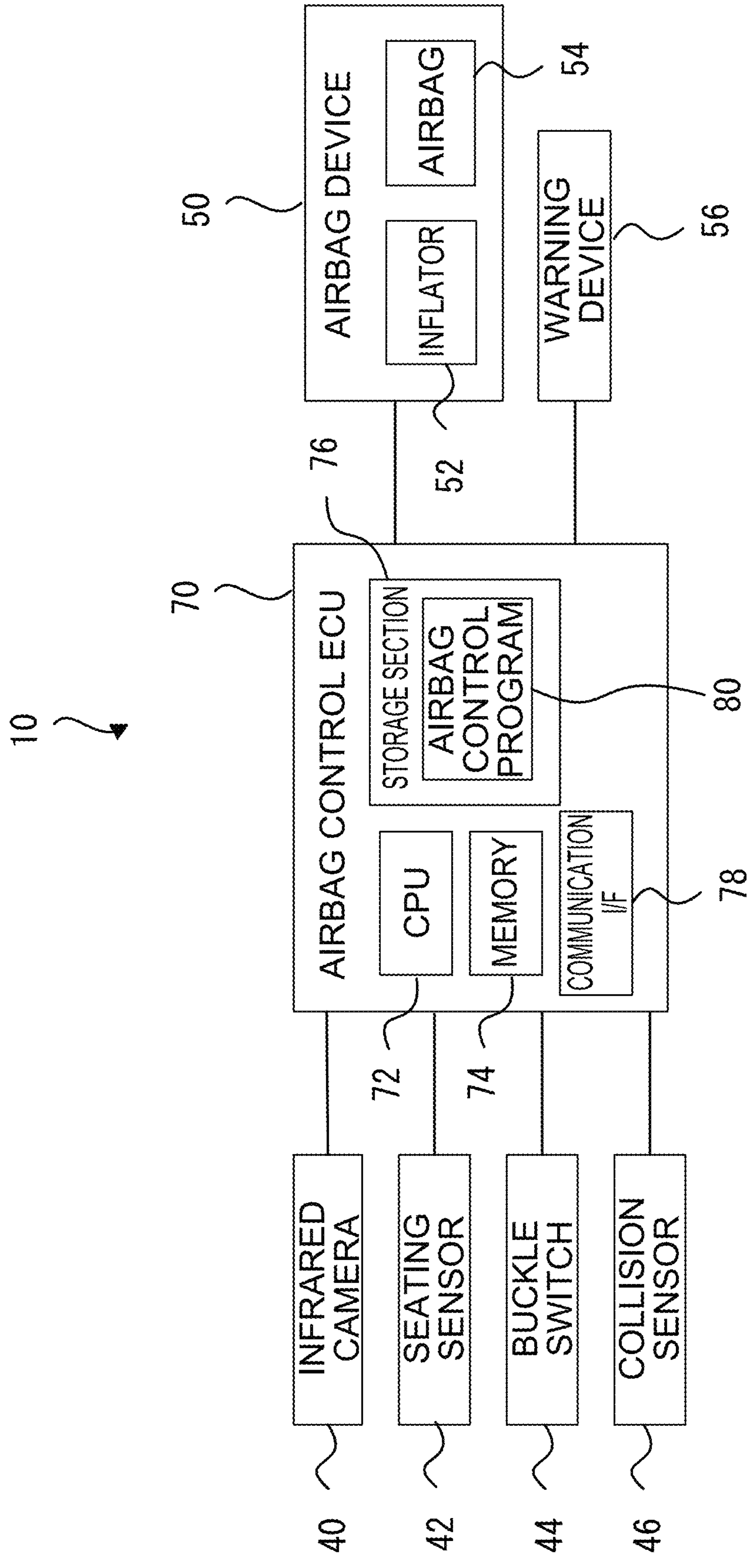
FIG. 1 is a block diagram illustrating a schematic configuration of an airbag control system according to an exemplary embodiment.

Detailed description follows regarding an example of exemplary embodiments of the present disclosure, with reference to the drawings. An airbag control system 10 illustrated in FIG. 1 is respectively provided corresponding to each seat of a vehicle. The airbag control system 10 includes an infrared camera 40, a seating sensor 42, a buckle switch 44, a collision sensor 46, an airbag control electronic control unit (ECU) 70, an airbag device 50, and a warning device 56. The airbag device 50 includes an inflator 52 and an airbag 54.

Figure 2:
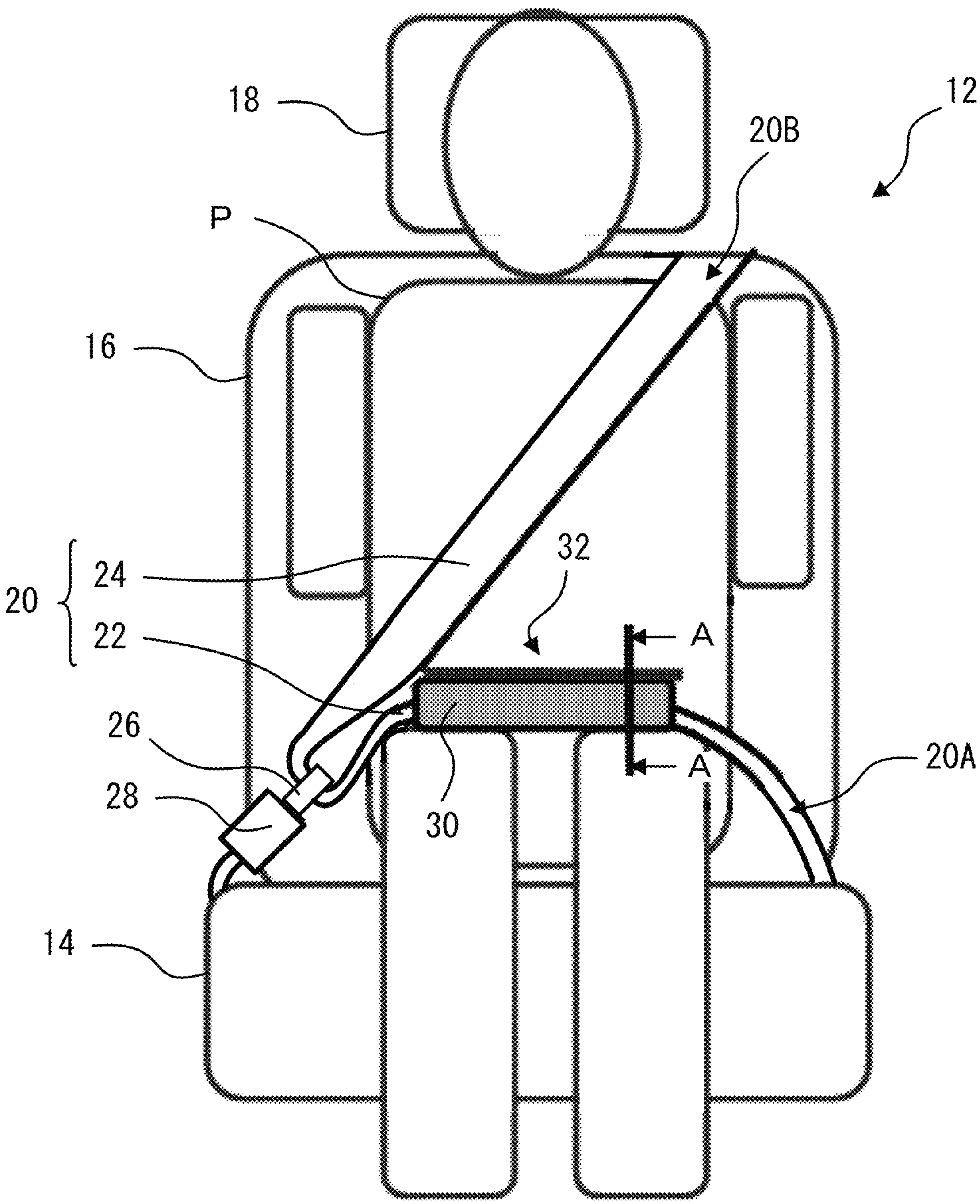
FIG. 2 is a front view illustrating a state in which a passenger seated on a seat is wearing a seatbelt untwisted.
Figure 3:
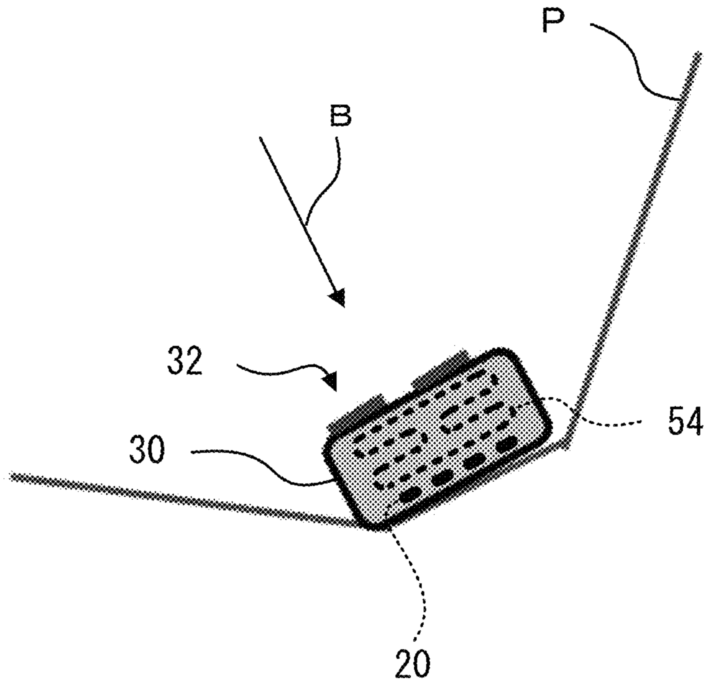
FIG. 3 is a schematic cross-section viewed along arrows A-A of FIG. 2 or FIG. 10.
Figure 4:
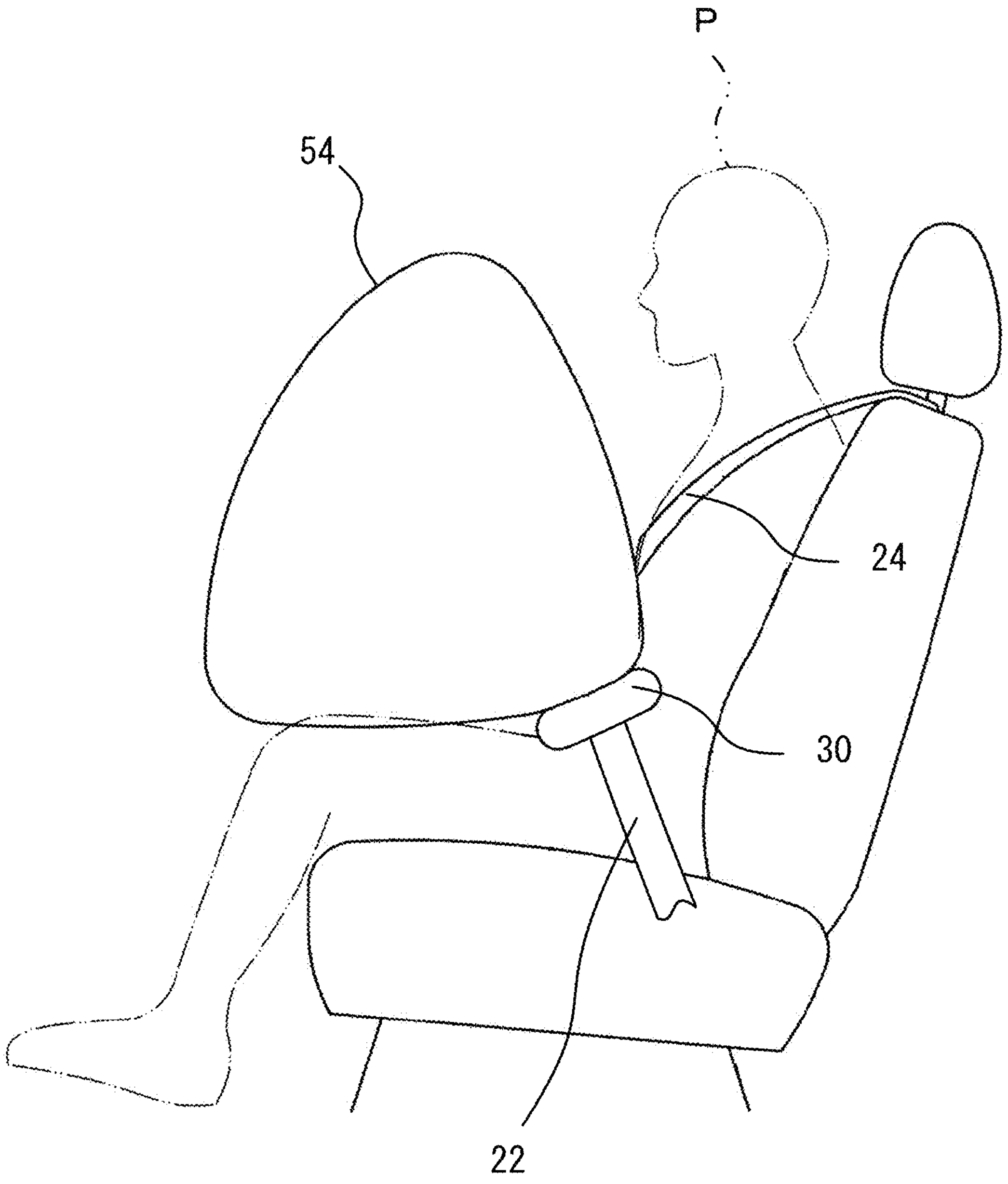
FIG. 4 is a side view illustrating a deployed state of a lap belt airbag.

Description first follows regarding the airbag device 50 and configuration peripheral thereto, with reference to FIG. 2 to FIG. 4. Although a rear seat of a vehicle is suitably employed as a seat 12 illustrated in FIG. 2, a front seat may also be employed. The seat 12 includes a seat cushion 14, a seatback 16 upstanding at an upper side of a rear end portion of the seat cushion 14, and a headrest 18 coupled to an upper end portion of the seatback 16. A passenger P seated on the seat cushion 14 of the seat 12 is restrained in the seat 12 by a seatbelt device equipped with a seatbelt 20.

The seatbelt device is a three-point seatbelt device, and a one-end portion 20A side of the seatbelt 20 is coupled to a non-illustrated lower anchor that has been fixed to the seat 12 or to a vehicle cabin floor. An other-end portion 20B side of the seatbelt 20 is configured so as be able to be wound up by a non-illustrated retractor, and a tongue member 26 is provided at an intermediate portion of the seatbelt 20. The tongue member 26 is attachable to and detachable from a buckle 28 provided on the opposite side of the seat cushion 14 of the seat 12 to the lower anchor side thereof.

The seatbelt 20 is worn by the passenger P by being pulled out from the retractor and the tongue member 26 being engaged with the buckle 28, thereby restraining the body of the passenger P in the seat 12. In the present exemplary embodiment, a section of the seatbelt 20 between the lower anchor and the tongue member 26 in a state in which the seatbelt 20 is being worn by the passenger is called a "lap belt section 22", and a section between the tongue member 26 and the retractor is called a "shoulder belt section 24".

A cover 30 is attached to the lap belt section 22. As illustrated in FIG. 3, the airbag 54 is a lap belt airbag provided at vehicle upper side of the lap belt section 22 when in a packed state. Note that "upper side of the lap belt section 22" means the side of the lap belt section 22 of the seatbelt 20 at the nearside when viewed from the infrared camera 40, described later, in a state in which the seatbelt 20 is being worn untwisted. The cover 30 is provided so as to cover the airbag 54 and so as to also cover the lap belt section 22. The inflator 52 may, for example, be housed inside the cover 30 together with the airbag 54, such that gas can be supplied to the airbag 54 through a gas introduction member disposed in the vicinity of the above-mentioned lower anchor.

The airbag 54 is formed in a bag shape, receives gas supplied from the inflator 52 during a vehicle collision and, as illustrated in FIG. 4, is deployed (deployed and expanded) from the lap belt section 22 toward the vehicle upper side and vehicle front side. The inflator 52 is a combustion type or cold gas type inflator, and generates gas on being actuated. The actuation of the inflator 52 is controlled by the airbag control ECU 70.

Figure 5A:
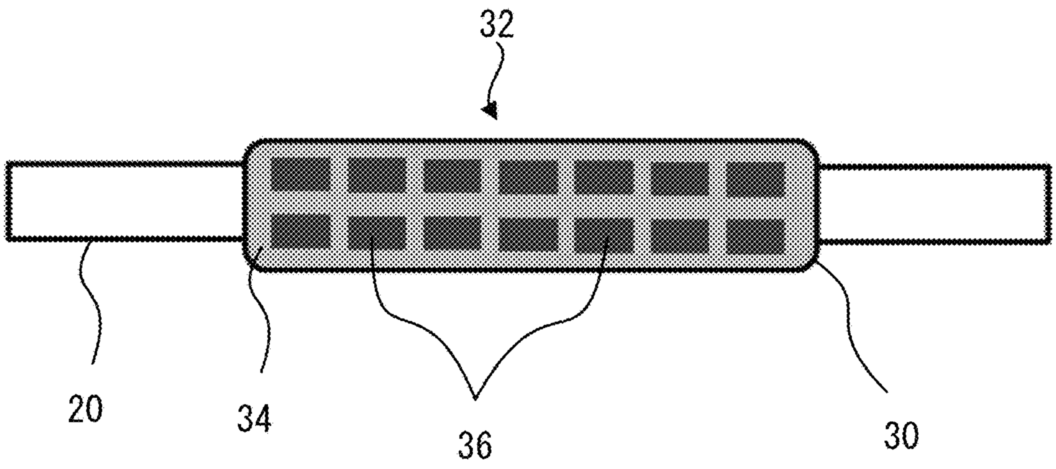
FIG. 5A is a plan view (configuration diagram) along arrow B in FIG. 3.

As illustrated in FIG. 3 and FIG. 5A, a first pattern (IR pattern) 32 is provided on the upper side of the cover 30. Note that "upper side of the cover 30" means the side of the cover 30 at the nearside when viewed from the infrared camera 40, described later, in a state in which the seatbelt 20 is being worn untwisted. The IR pattern 32 is configured with plural rectangular shaped infrared reflective portions 36 that have infrared reflectivity higher than that of a background portion 34 and are arrayed in a matrix shape. Note that the background portion 34 is an example of a first portion in the present disclosure, and the infrared reflective portions 36 are examples of a second portion in the present disclosure.

Figure 5B:
FIG. 5B is a plan view (visible light image) along arrow B in FIG. 3.
Figure 5C:
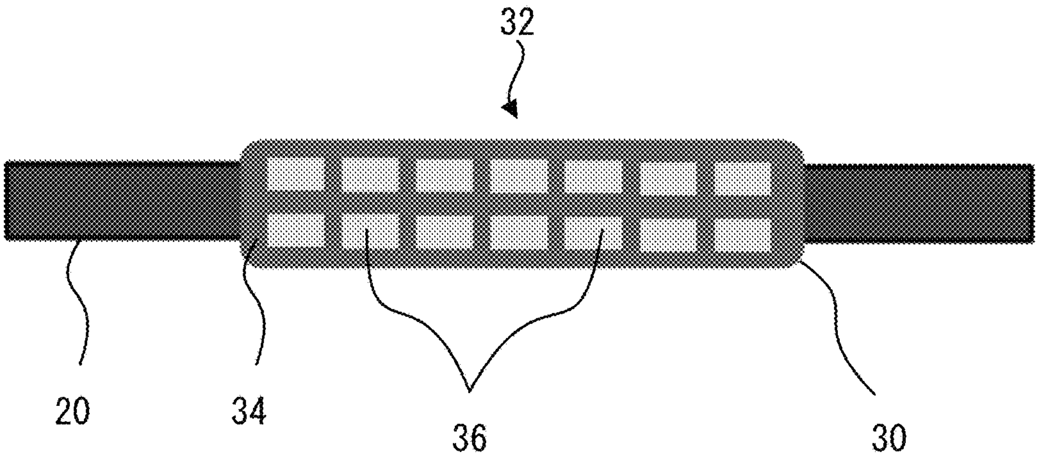
FIG. 5C is a plan view (infrared image) along arrow B in FIG. 3.

The cover 30 is configured from separate cloths on the upper side and the lower side. This means that the infrared reflective portions 36 of the IR pattern 32 can, for example, be formed by interweaving a thread that has been impregnated with a material having a high infrared reflectivity when weaving the fabric forming the upper side of the cover 30. The infrared reflective portions 36 of the IR pattern 32 may also be formed by coating the cover 30 with a material having a high infrared reflectivity. In the present exemplary embodiment, the visible light reflectivity of the background portion 34 and of the infrared reflective portions 36 are both about the same, and so the IR pattern 32 is not able to be distinguished with the naked eye, as illustrated in FIG. 5B. However, as illustrated in FIG. 5C, the IR pattern 32 is able to be distinguished in an infrared (IR) image captured by the infrared camera 40.

The infrared camera 40 illustrated in FIG. 1 is installed inside a vehicle cabin, for example to a ceiling portion, of a vehicle, and is adjusted in orientation so as to capture an image of the seat 12 including the cover 30 from a vehicle front side and vehicle upper side thereof. Note that the infrared camera 40 is an example of an imaging section of the present disclosure. Moreover, the seating sensor 42 is provided at the seat cushion 14, and detects a load W imparted to a seating face of the seat cushion 14. The buckle switch 44 is inbuilt into the buckle 28, and the buckle switch 44 switches between a contact point being ON when a tongue member 26 is engaged with a buckle 28, and the contact point being OFF when engagement between the tongue member 26 and the buckle 28 is released.

Furthermore, the collision sensor 46 is formed from an accelerometer for detecting acceleration in the vehicle front-rear direction and detects, as a vehicle collision, when a state in which an acceleration of a predetermined value or greater, corresponding to cases in which the vehicle has collided with an object, has continued to be detected for a predetermined period of time or greater. The warning device 56 is equipped with a display section such as a display, and with an audio output section such as a speaker, and the warning device 56 issues a warning to the seated passenger under instruction from the airbag control ECU 70.

Figure 6:
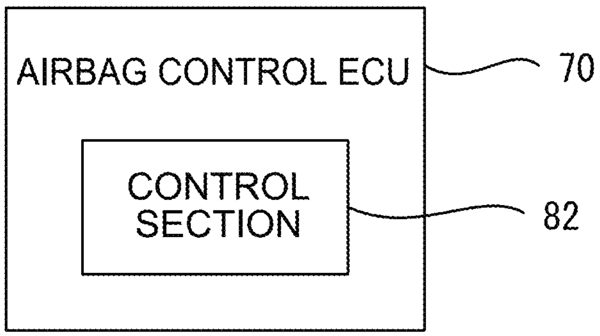
FIG. 6 is a functional block diagram of an airbag control ECU.

The airbag control ECU 70 includes a central processing unit (CPU) 72 serving as a processor, a memory 74 such as read only memory (ROM), random access memory (RAM), or the like, a non-volatile storage section 76 such as a hard disk drive (HDD), an solid state drive (SSD), or the like, and a communication interface (I/F) 78. An airbag control program 80 that causes the CPU 72 of the airbag control ECU 70 to function as a control section 82 (FIG. 6) is stored on the storage section 76. The airbag control program 80 is an example of an airbag control program according to the present disclosure.

The control section 82 determines at least one of propriety of deploying the airbag 54, or propriety of warning a seated passenger, according to an appearance of the IR pattern 32 in an IR image captured by the infrared camera 40 capturing a range including a cover provided with the IR pattern 32 at least on the front surface thereof, with the cover covering the airbag 54 provided in a packed state on a section of the seatbelt 20 and covering the section of the seatbelt 20 together with the airbag.

Figure 7:
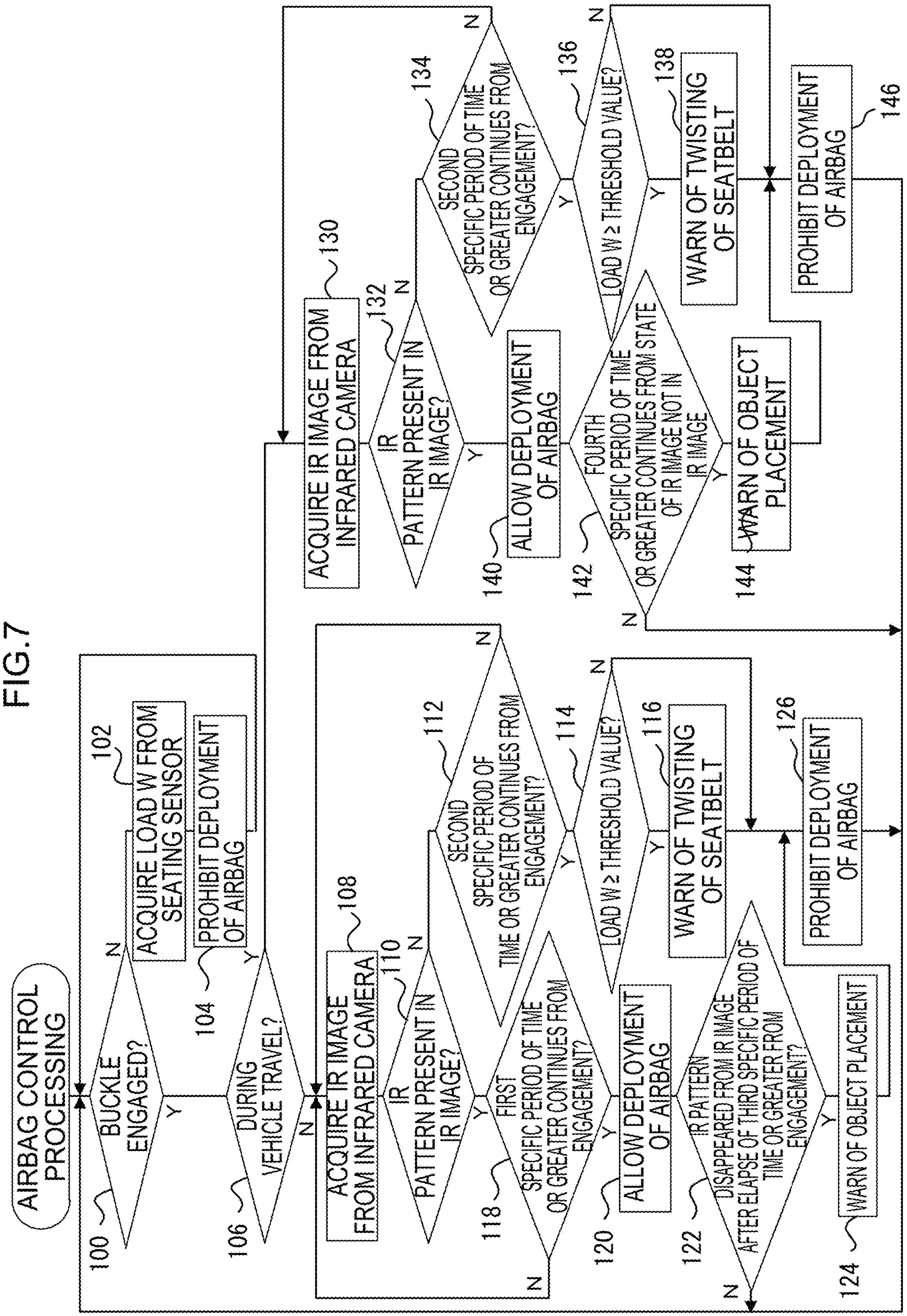
FIG. 7 is a flowchart illustrating content of airbag control processing.

Next, description follows of operation of the present exemplary embodiment regarding, for example, airbag control processing executed by the airbag control ECU 70 while the ignition switch of the vehicle is ON, with reference to FIG. 7.

At step 100 of the airbag control processing, the control section 82 determines whether or not the tongue member 26 provided at the seatbelt 20 has been engaged with the buckle 28. Processing transitions to step 102 when negative determination is made at step 100. At step 102, the control section 82 acquires a load W imparted to the seating face of the seat cushion 14 from the seating sensor 42, and stores the acquired load W in the memory 74 or the like. Next at step 104, the control section 82 performs processing to prohibit deployment of the airbag 54 such as by, for example, setting a predetermined flag for controlling the airbag 54 to a value that means deployment of the airbag 54 is prohibited.

Note that in the present exemplary embodiment the "predetermined flag for controlling the airbag 54" is referenced by the airbag control ECU 70 when a vehicle collision has been detected by the collision sensor 46. Control is performed such that the airbag 54 is not deployed in a case in which the "value that means deployment of the airbag 54 is prohibited" has been set for the predetermined flag, and such that the airbag 54 is deployed in a case in which a "value that means deployment of the airbag 54 is allowed" has been set therefor.

Processing returns to step 100 when the processing of step 104 has been performed, and the processing of steps 100 to 104 are repeated until affirmative determination is made at step 100. This means that the load W stored in the memory 74 or the like is repeatedly updated, and deployment of the airbag 54 is prohibited while the tongue member 26 is not engaged with the buckle 28.

Determination of step 100 is affirmative when the tongue member 26 is engaged with the buckle 28, and processing transitions to step 106. At step 106, the control section 82 determines whether or not the vehicle is traveling. Negative determination is made at step 106 in a case in which the vehicle is a stationary vehicle, and processing transitions to step 108. At step 108, the control section 82 acquires an infrared image (IR image) captured by the infrared camera 40 from the infrared camera 40.

Moreover, at step 110, the control section 82 determines whether or not an image region corresponding to the IR pattern 32 is present in the IR image acquired at step 108. The determination at step 110 may, for example, be implemented by extracting from the IR image all IR regions formed from pixels having an infrared reflectivity of a predetermined value or greater with a surface area S that is at least a surface area threshold value Sth, and determining whether or not the extracted IR regions are arrayed in a matrix shape in the IR image (see also FIG. 5C). Processing transitions to step 112 when negative determination is made at step 110.

At step S112, the control section 82 determines whether or not the state in which no image region corresponding to the IR pattern 32 is present in the IR image has continued for a second predetermined period of time t2 or greater from when the tongue member 26 engaged with the buckle 28. Note that, for example, a period of time of the order of several seconds may be applied as the second predetermined period of time t2. Processing returns to step 108 when negative determination is made at step 112, and step 108 to step 112 are repeated until affirmative determination is made at either step 110 or step 112.

Processing transitions to step 114 in a case in which affirmative determination is made at step 112. In such cases, the cause of no image region corresponding to the IR pattern 32 being present in the IR image may be considered to be "child seat fixed by seatbelt" or "twisting of seatbelt" due to still being a timing shortly after the tongue member 26 has been engaged with the buckle 28.

Figure 8:
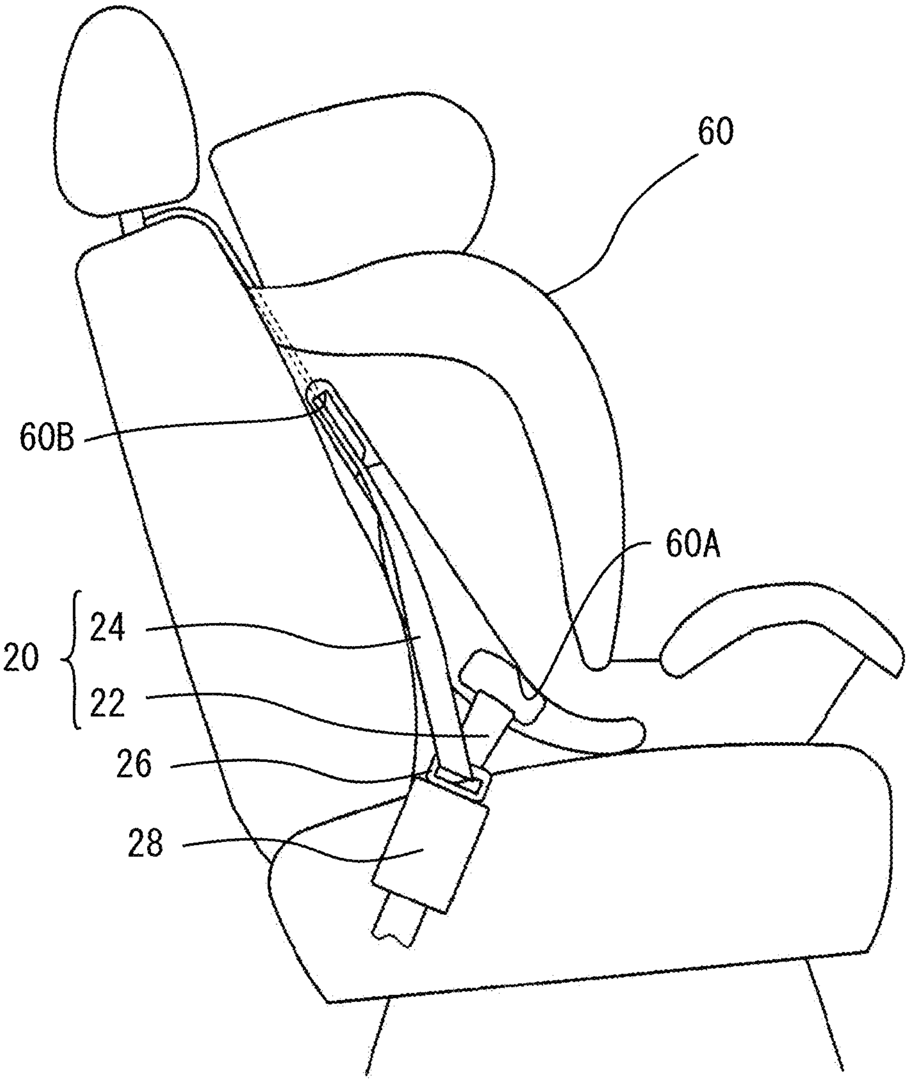
FIG. 8 is a side view illustrating a state of a child seat fixed with a seatbelt.

As illustrated by the example of FIG. 8, a child seat 60 is provided with belt through holes 60A, 60B in the vicinity of the back face thereof, and after the seatbelt 20 has been passed through these belt through holes 60A, 60B, the child seat 60 is fixed by the tongue member 26 being engaged with the buckle 28. In this state the cover 30 provided with the IR pattern 32 is positioned in the vicinity of the back face of the child seat 60, and so the IR pattern 32 is not captured by the infrared camera 40. Moreover, in a case in which twisting has occurred in the seatbelt 20, this results in the cover 30 provided with the IR pattern 32 being flipped over, and so the IR pattern 32 is not captured by the infrared camera 40.

Thus at the next step 114, the control section 82 determines whether or not the load W stored in the memory 74 or the like (the load W immediately prior to the tongue member 26 being engaged with the buckle 28) is a predetermined load threshold value Wth or greater. Note a value capable of discriminating between the load W imparted to the seating face of the seat cushion 14 being a load value that might be determined as a passenger having sat down or being a smaller load value thereto (a load value when fixed with the child seat 60) may be employed as the predetermined load threshold value Wth.

In a case in which negative determination is made at step 114, the cause of the image region corresponding to the IR pattern 32 not being present in the IR image can be determined to be "child seat fixed by seatbelt". Processing accordingly transitions from step 114 to step 126. Then at step 126, the control section 82 performs processing to prohibit deployment of the airbag 54 during a vehicle collision by, for example, setting the predetermined flag for controlling the airbag 54 to a value that means deployment of the airbag 54 is prohibited. The child seat 60 is thereby prevented from being sent flying by the airbag 54 being deployed during a vehicle collision. Processing returns to step 100 when the processing of step 126 has been performed.

In a case in which affirmative determination is made at step 114, the cause of the image region corresponding to the IR pattern 32 not being present in the IR image can be determined as "twisting of seatbelt". Processing accordingly transitions from step 114 to step 116. At step 116, the control section 82 determines a need to warn the seated passenger, and uses the warning device 56 to notify the passenger that the seatbelt 20 is twisted. An action is thereby performed by the passenger to eliminate the twisting of the seatbelt 20. Processing transitions to step 126 when the processing of step 116 has been performed, and at step 126 the control section 82 performs processing to prohibit deployment of the airbag 54 during a vehicle collision. Processing returns to step 100 when the processing of step 126 has been performed.

Moreover at step 110, affirmative determination is made at step 110 and processing transitions to step 118 when an image region corresponding to the IR pattern 32 is present in the IR image. At step 118, the control section 82 determines whether or not the state in which the image region corresponding to the IR pattern 32 is present in the IR image has continued for a first predetermined period of time t1 or greater from when the tongue member 26 engaged with the buckle 28. Note that, for example, a period of time of the order of several seconds may be applied as the first predetermined period of time t1. Processing returns to step 108 when negative determination is made at step 118, and steps 108, 110, 118 are repeated until either negative determination is made at step 110, or until affirmative determination is made at step 118.

Processing transitions to step 120 in a case in which affirmative determination is made at step 118. At step 120, the control section 82 performs processing to allow deployment of the airbag 54 during a vehicle collision by, for example, setting a value that means deployment of the airbag 54 is allowed for the predetermined flag for controlling the airbag 54. At next step 122, the control section 82 determines whether or not the image region corresponding to the IR pattern 32 has disappeared from the IR image after a third predetermined period of time t3 or greater has elapsed from when the tongue member 26 engaged with the buckle 28. Note that, for example, a period of time of about 1 minute may be applied as the third predetermined period of time t3. Processing returns to step 100 when negative determination is made at step 122.

Figure 9:
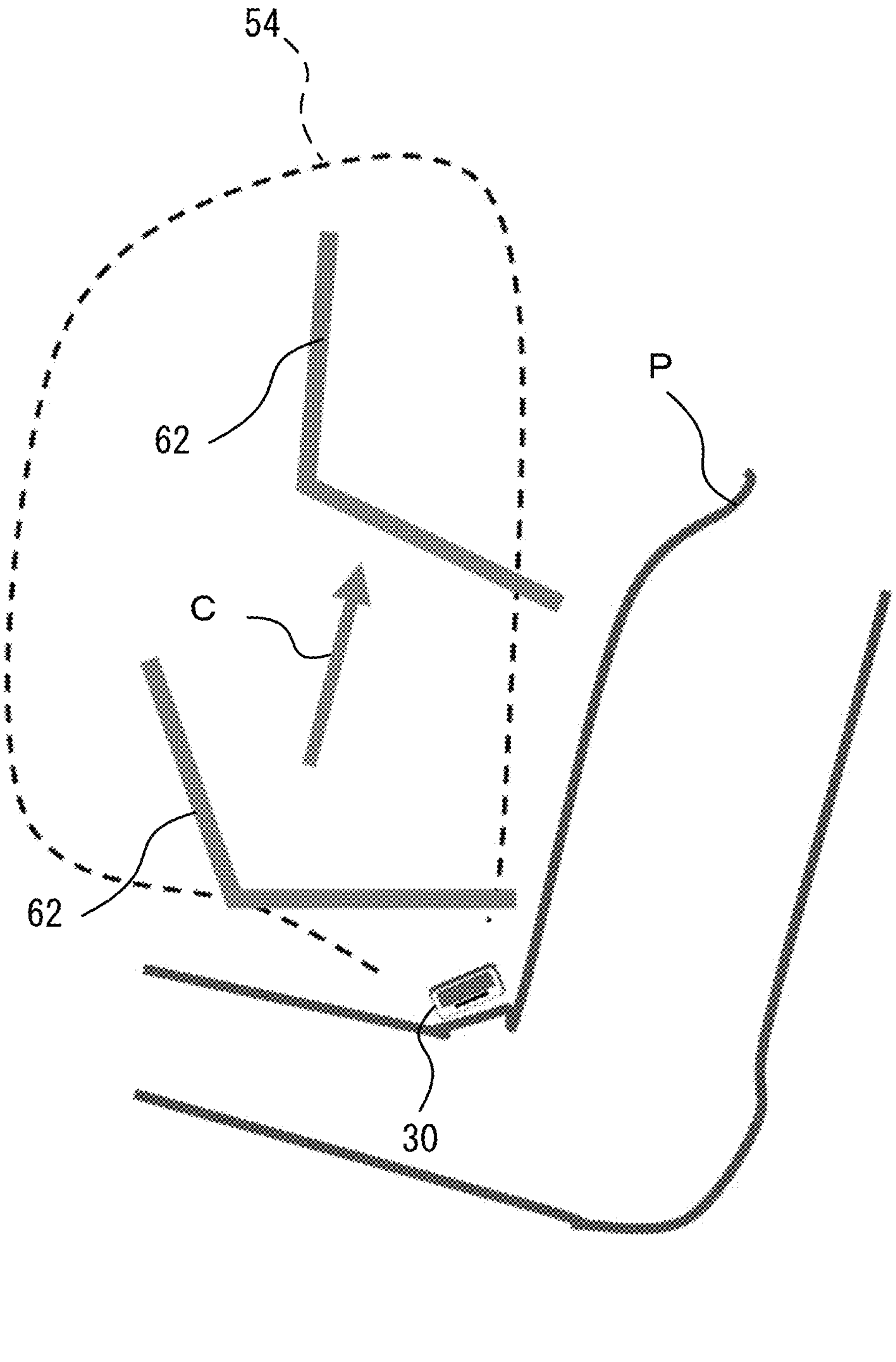
FIG. 9 is an explanatory diagram to illustrate an object being sent flying when an airbag has been deployed in a state in which the object is placed on the knees of the passenger.

However, in a case in which affirmative determination is made at step 122, the cause of the image region corresponding to the IR pattern 32 disappearing from the IR image can be determined as "object placed on knees of passenger". For example, as illustrated in FIG. 9, the IR pattern 32 is not captured by the infrared camera 40 in a case in which an object 62 such as a PC is placed on the knees of the passenger P due to infrared rays being masked by the object 62. Moreover, were the airbag 54 to be deployed in a state in which the object 62 was placed on the knees of the passenger P, then the object 62 would possibly be sent flying as illustrated by arrow C in FIG. 9.

This means that processing transitions to step 124 in a case in which affirmative determination is made at step 122, at step 124 the control section 82 determines a need to warn the seated passenger, and the passenger is notified by the warning device 56 that the object 62 is placed on the knees of the passenger P. Processing transitions to step 126 when the processing of step 124 has been performed, and at step 126 the control section 82 performs processing to prohibit deployment of the airbag 54 during a vehicle collision. Processing returns to step 100 when the processing of step 126 has been performed.

Moreover at step 106, affirmative determination is made at step 106 and processing transitions to step 130 when the vehicle is traveling, and similar processing to that of steps 108 to 116, and 126 is performed at steps 130 to 138, and 146.

Namely, at step 130 the control section 82 acquires an IR image from the infrared camera 40. Moreover, at step 132, the control section 82 determines whether or not an image region corresponding to the IR pattern 32 is present in the IR image acquired at step 130. Processing transitions to step 134 when negative determination is made at step 132. At step 134, the control section 82 determines whether or not a state in which no image region corresponding to the IR pattern 32 is present in the IR image has continued for a second predetermined period of time t2 or greater from when the tongue member 26 engaged with the buckle 28. Processing returns to step 130 when negative determination is made at step 134, and step 130 to step 134 are repeated until affirmative determination is made at step 132 or at step 134.

Processing transitions to step 136 when affirmative determination is made at step 134. At step 136, the control section 82 determines whether or not the load W stored in the memory 74 or the like is the predetermined load threshold value Wth or greater. Processing transitions to step 146 in a case in which negative determination is made at step 136, and at step 146 the control section 82 performs processing to prohibit deployment of the airbag 54 during a vehicle collision. The child seat 60 is thereby prevented from being sent flying during deployment of the airbag 54. Processing returns to step 100 when the processing of step 146 has been performed.

Moreover, processing transitions to step 138 when affirmative determination is made at step 136, and at step 138 the control section 82 determines a need to warn the seated passenger and uses the warning device 56 to notify the passenger that the seatbelt 20 is twisted. Moreover, processing transitions to step 146 when the processing of step 138 has been performed, and at step 146 the control section 82 performs processing to prohibit deployment of the airbag 54 during a vehicle collision. Processing returns to step 100 when the processing of step 146 has been performed.

Moreover at step 132, affirmative determination is made at step 132 and processing transitions to step 140 when the image region corresponding to the IR pattern 32 is present in the IR image. At step 140, the control section 82 performs processing to allow deployment of the airbag 54 during a vehicle collision. Next at step 142, the control section 82 determines whether or not a state in which no image region corresponding to the IR pattern 32 is present in the IR image has continued for a fourth predetermined period of time t4 or greater. Note that, for example, a period of time of about 1 minute may be applied as the fourth predetermined period of time t4. Processing returns to step 100 when negative determination is made at step 142.

On the other hand, the cause of no image region corresponding to the IR pattern 32 being present in the IR image can be determined as "object placed on knees of passenger" when affirmative determination is made at step 142. Processing accordingly transitions to step 144 when affirmative determination is made at step 142, and at step 144 the control section 82 determines a need to warn the seated passenger and uses the warning device 56 to notify the passenger that the object 62 is placed on the knees of the passenger P. Processing transitions to step 146 when the processing of step 144 has been performed, and at step 146 the control section 82 performs processing to prohibit deployment of the airbag 54. Processing returns to step 100 when the processing of step 146 has been performed.

As described above, the airbag control ECU 70 according to the present exemplary embodiment functions as the control section 82 that determines at least one of propriety of deploying the airbag 54 or propriety of warning the seated passenger according to an appearance of the first pattern (the IR pattern 32) in the image (IR image) captured by the imaging section (infrared camera 40) for capturing a range including the cover 30 provided with the first pattern (IR pattern 32) at least on the front surface thereof, with the cover 30 covering the airbag 54 provided in a packed state on a section of the seatbelt 20 and covering the section of the seatbelt 20 together with the airbag 54. This thereby enables malfunction such as an object being sent flying during deployment of the airbag 54 to be suppressed from occurring by implementation using a simple configuration.

Moreover, in the present exemplary embodiment, the airbag 54 is a lap belt airbag housed at an upper side of the lap belt section 22 of the seatbelt 20, the cover 30 is provided so as to cover the airbag 54 and the lap belt section 22, and the first pattern (IR pattern 32) is provided on the upper side of the cover 30. This thereby enables easy determination, from an appearance in an image of the first pattern provided on the upper face of the cover 30 covering the lap belt airbag, as to whether or not any of these apply from "child seat fixed by seatbelt", "twisted lap belt section", or "object placed on knees of passenger".

Moreover, in the present exemplary embodiment, the control section 82 allows deployment of the airbag 54 when the first predetermined period of time t1 or greater continues from when the tongue member 26 provided at the seatbelt 20 engaged with the buckle 28 and the first pattern (IR pattern 32) is visible in the image (IR image), or when the first pattern (IR pattern 32) is visible in the image (IR image) during vehicle travel. This thereby enables the airbag 54 to be deployed during a vehicle collision needing deployment of the airbag 54, and enables the seated passenger to be appropriately protected by the deployed airbag 54.

Moreover, in the present exemplary embodiment, the control section 82 prohibits deployment of the airbag 54 in a case in which the second predetermined period of time t2 or greater continues from when the tongue member 26 provided at the seatbelt 20 engaged with the buckle 28 and the first pattern (IR pattern 32) is not visible in the image (IR image). This thereby enables the child seat 60 to be reliably prevented from being sent flying or the like due to the deployment of the airbag 54.

Moreover, in the present exemplary embodiment, the control section 82 warns the seated passenger in a case in which the second predetermined period of time t2 or greater continues from when the tongue member 26 provided at the seatbelt 20 engaged with the buckle 28 and the first pattern (IR pattern 32) is not visible in the image (IR image) that is also a case in which the load, detected by the seating sensor 42 for detecting the load on the seating face of the seat 12 provided with the seatbelt 20, is less than the load threshold value Wth prior to the tongue member 26 being engaged with the buckle 28. This thereby enables deployment behavior of the airbag 54 to be made safe by the passenger eliminating twisting of the seatbelt 20.

Moreover, in the present exemplary embodiment, the control section 82 performs at least one of prohibiting deployment of the airbag 54 or warning the seated passenger in a case in which the first pattern (IR pattern 32) is no longer visible in the image (IR image) after the third predetermined period of time t3 or greater has elapsed from when the tongue member 26 provided at the seatbelt 20 engaged with the buckle 28, or in a case in which a state in which the first pattern (IR pattern 32) is not visible in the image (IR image) during vehicle travel has continued for the fourth predetermined period of time t4 or greater. This means that when deployment of the airbag 54 has been prohibited, a placed object can be reliably prevented from being sent flying or the like due to deployment of the airbag 54, and that when the seated passenger has been warned, a deployable condition of the airbag 54 can be achieved by the object placed on the knees of the passenger being removed by the passenger.

Moreover, in the present exemplary embodiment, the imaging section is the infrared camera 40, and the first pattern is the pattern (IR pattern 32) that combines the first portion (background portion 34) with the second portions (infrared reflective portions 36) having a higher infrared reflectivity than the first portion. This thereby enables the visibility of the cover 30 provided with the first pattern to be raised, and also enables the first pattern (IR pattern 32) to be reliable distinguished in the IR image.

Figure 10:
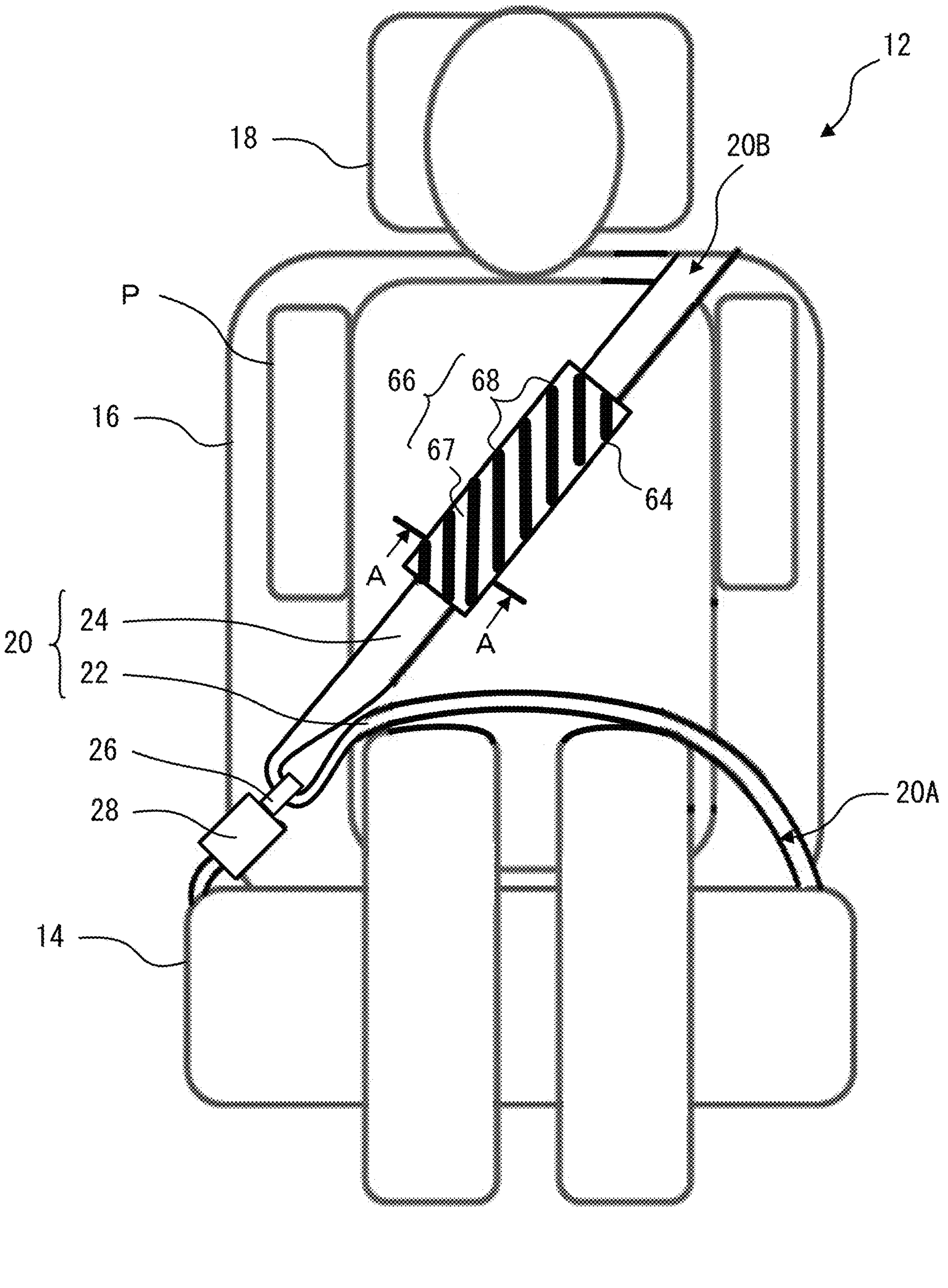
FIG. 10 is a front view illustrating another example of an airbag, a cover, and an IR pattern in a state in which a passenger seated on a seat is wearing a seatbelt untwisted.
Figure 11:
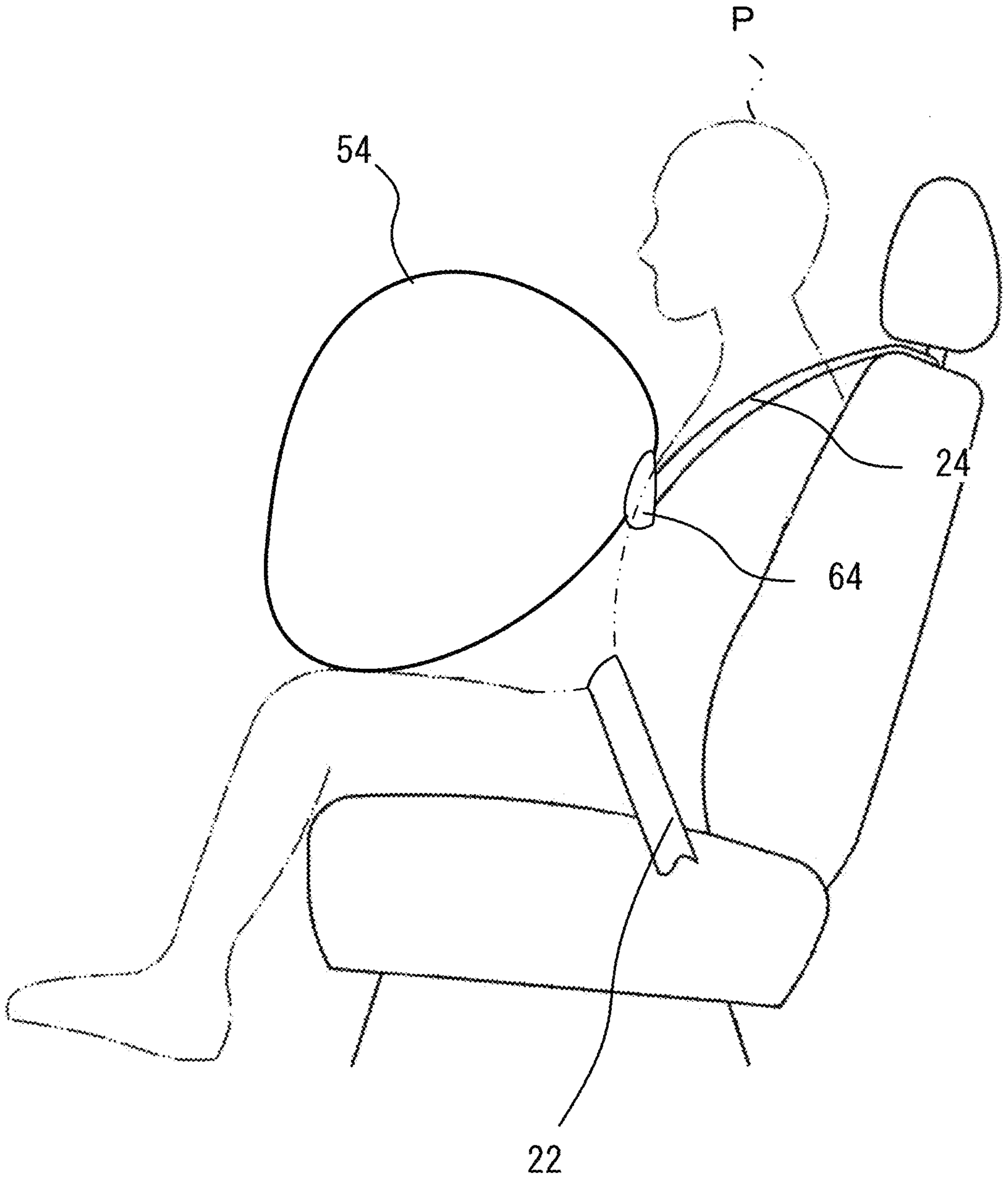
FIG. 11 is a side view illustrating a deployed state of a shoulder belt airbag.

Note that although in the above exemplary embodiment a mode has been described in which the airbag 54 is a lap belt airbag provided in a packed state at the upper side of the lap belt section 22, the placement position of the airbag 54 is not limited to the above mode in the present disclosure. As in an example illustrated in FIG. 10, the airbag 54 may be a shoulder belt airbag provide in a packed state at a front side of the shoulder belt section 24. Note that "front side of the shoulder belt section 24" means the side of the shoulder belt section 24 of the seatbelt 20 at the nearside as viewed from the infrared camera 40 in a state in which the seatbelt 20 is being worn untwisted. In the mode illustrated in FIG. 10, a cover 64 is provided so as to cover the airbag 54 and also cover the shoulder belt section 24. The airbag 54 is formed in a bag shape, receives gas supplied from the inflator 52 during a vehicle collision, and as illustrated in FIG. 11, is deployed (deployed and expanded) toward the vehicle lower side and the vehicle front side from the shoulder belt section 24. The present disclosure is also applicable when the airbag 54 is a shoulder belt airbag.

Moreover, a mode has been described in the above exemplary embodiment in which the airbag 54 is configured as a separated body to the seatbelt 20 and disposed overlapping in a packed state with a section of the seatbelt 20 (the lap belt section 22 or the shoulder belt section 24). However, the airbag in the present disclosure is not limited to the configuration described above. The airbag may, for example, be an airbag (so-called airbelt) that is inbuilt in a packed state into a section of a seatbelt (the lap belt section 22 or the shoulder belt section 24) and is configured to bulge out from inside the seatbelt during a vehicle collision.

Moreover, in the above exemplary embodiment an example of the first pattern according to the present disclosure has been described in which the IR pattern 32 formed by plural of the rectangular shaped infrared reflective portions 36 having a higher infrared reflectivity than the background portion 34 being arrayed in a matrix shape (see FIG. 5A and the like). However, the first pattern is not limited to the IR pattern 32, and may be any pattern distinguishable in an IR image. For example, as illustrated in FIG. 10, an IR pattern 66 may be provided on a front side of the cover 64 as another example of the first pattern. Note that "front side of the cover 64" means at the side of the cover 64 that is the nearside as viewed from the infrared camera 40 in a state in which the seatbelt 20 is being worn untwisted. The IR pattern 66 is configured by plural flat rectangular shaped infrared reflective portions 68 having a higher infrared reflectivity than a background portion 67 arrayed in a matrix shape. The first pattern according to the present disclosure may be the IR pattern 66 illustrated in FIG. 10 and, for example, may be an IR pattern in which infrared reflective portions are distributed across the entire surface of the upper side of the cover 30 or the front side of the cover 64.

Moreover, although a mode was described in the above exemplary embodiment in which the first pattern was provided only to the upper side of the cover 30 or to the front side of the cover 64, the present disclosure is not limited thereto. For example, a different IR pattern to that of the upper side of the cover 30 or the front side of the cover 64 may be provided on the lower side of the cover 30 or to the rear side of the cover 64. The pattern provided on the lower side of the cover 30 or to the rear side of the cover 64 is an example of the second pattern of the present disclosure. This mode enables determination of "child seat fixed by seatbelt" in a case in which, immediately after the tongue member 26 has engaged with the buckle 28, the first pattern is not present in the IR image and the second pattern is also not present in the IR image. Moreover, enables determination of "twisting of seatbelt" in a case in which, immediately after the tongue member 26 has been engaged with the buckle 28, the first pattern is not present in the IR image but the second pattern is present in the IR image.

Furthermore, although in the above exemplary embodiment a mode has been described in which the airbag control ECU 70 (control section 82) executes all of the airbag control processing illustrated in FIG. 7, a configuration may be adopted in which part of the processing is executed from out of the processing illustrated in FIG. 7. Predeterminedally, for example, the control section 82 may perform only processing to allow deployment of the airbag 54 in a case in which the first predetermined period of time t1 or greater continues from when the tongue member 26 provided at the seatbelt 20 engaged with the buckle 28 and the first pattern 32 is visible in the image. Moreover, for example, the control section 82 may perform only processing to prohibit deployment of the airbag 54 in a case in which the second predetermined period of time t2 or greater continues from when the tongue member 26 provided at the seatbelt 20 engaged with the buckle 28 and the first pattern 32 is not visible in the image.

Moreover, although in the above exemplary embodiment a mode has been described in which an IR pattern distinguishable in an IR image is applied as the first pattern and the second pattern according to the present disclosure, the present disclosure is not limited thereto. The first pattern and the second pattern according to the present disclosure may, for example, be a pattern distinguishable with the naked eye.

Moreover, in the above exemplary embodiment a mode has been described in which at least the first pattern is provided at the cover 30 or the cover 64 covering the airbag 54 and a section of the seatbelt 20. However, a cover able to be provided with a pattern is not limited to the above and, for example, at least the first pattern may be provided at a neck contact prevention cover that is provided at the seatbelt 20 to relieve interference of the seatbelt 20 with the neck of the seated passenger. Moreover, for example, at least the first pattern may be provided at a heartrate detection sensor cover provided at the seatbelt 20 to protect a heartrate detection sensor for detecting the heartrate of the seated passenger.

Moreover, for example, at least the first pattern may be provided an externally attached heater cover provided at a heater and to the seatbelt 20.

Moreover, in the above exemplary embodiment a mode has been described in which the airbag control program 80 is pre-stored (installed) on the storage section 76 as an example of the airbag control program according to the present disclosure. However, the airbag control program according to the present disclosure may be provided in a format recorded on a non-transitory recording medium such as an HDD, SSD, DVD, or the like.

The following additional notes are further disclosed in relation to the above exemplary embodiments.

Additional Note 1

An airbag control device including:

a control section that determines at least one of propriety of deploying an airbag or propriety of warning a seated passenger according to appearance of a first pattern in an image, captured by an imaging section for capturing a range including a cover having the first pattern provided on at least a front surface side and covering the airbag provided in a packed state at a section of a seatbelt and covering the section of the seatbelt together with the airbag.

Additional Note 2

The airbag control device of Additional note 1, wherein the airbag is a lap belt airbag housed at an upper side of a lap belt section of the seatbelt, the cover is provided so as to cover the airbag and the lap belt section, and the first pattern is provided at an upper side surface of the cover.

Additional Note 3

The airbag control device of Additional note 1, wherein the airbag is a shoulder belt airbag housed at a front side of a shoulder belt section of the seatbelt, the cover is provided so as to cover the airbag and the shoulder belt section, and the first pattern is provided at a front side surface of the cover.

Additional Note 4

The airbag control device of any one of Additional note 1 to Additional note 3, wherein the control section allows deployment of the airbag in a case in which a first predetermined period of time or greater continues from when the tongue member provided at the seatbelt engaged with the buckle and the first pattern is visible in the image, or in a case in which the first pattern is visible in the image during travel of a vehicle.

Additional Note 5

The airbag control device of Additional note 4, wherein the control section prohibits deployment of the airbag in a case in which a second predetermined period of time or greater continues from when the tongue member provided at the seatbelt engaged with the buckle and the first pattern is not visible in the image.

Additional Note 6

The airbag control device of Additional note 5, wherein the control section warns the seated passenger in a case in which the second predetermined period of time or greater continues from when the tongue member provided at the seatbelt engaged with the buckle and the first pattern is not visible in the image that is also a case in which a load detected prior to the tongue member being engaged with the buckle as detected by a seating sensor for detecting loads on a seating face of the seat provided with the seatbelt is a load that is less than a threshold value.

Additional Note 7

The airbag control device of Additional note 4, wherein the control section performs at least one of prohibiting deployment of the airbag or warning the seated passenger in a case in which the first pattern is no longer visible in the image after elapse of a third predetermined period of time or greater from when the tongue member provided at the seatbelt engaged with the buckle, or in a case in which a state of the first pattern not being visible in the image during travel of the vehicle has continued for a fourth predetermined period of time or greater.

Additional Note 8

The airbag control device of Additional note 2, wherein:

a second pattern different from the first pattern is provided at a lower side of the cover; and the control section prohibits deployment of the lap belt airbag in a case in which the second pattern is visible in the image.

Additional Note 9

The airbag control device of Additional note 3, wherein:

a second pattern different from the first pattern is provided at a rear side of the cover; and the control section prohibits deployment of the shoulder belt airbag in a case in which the second pattern is visible in the image.

Additional Note 10

The airbag control device of any one of Additional note 1 to Additional note 8, wherein the imaging section is an infrared camera, and the first pattern is a pattern combining a first portion with a second portion having a higher infrared reflectivity than the first portion.

Additional Note 11

An airbag control method of processing executed by a computer, the processing including:

determining at least one of propriety of deploying an airbag or propriety of warning a seated passenger according to appearance of a first pattern in an image, captured by an imaging section for capturing a range including a cover having the first pattern provided on at least a front surface side and covering the airbag provided in a packed state at a section of a seatbelt and covering the section of the seatbelt together with the airbag.

Additional Note 12

The airbag control method of Additional note 11, wherein the airbag is a lap belt airbag housed at an upper side of a lap belt section of the seatbelt, the cover is provided so as to cover the airbag and the lap belt section, and the first pattern is provided at an upper side surface of the cover.

Additional Note 13

The airbag control method of Additional note 11, wherein the airbag is a shoulder belt airbag housed at a front side of a shoulder belt section of the seatbelt, the cover is provided so as to cover the airbag and the shoulder belt section, and the first pattern is provided at a front side surface of the cover.

Additional Note 14

The airbag control method of any one of Additional note 11 to Additional note 13, wherein deployment of the airbag is allowed in a case in which a first predetermined period of time or greater continues from when the tongue member provided at the seatbelt engaged with the buckle and the first pattern is visible in the image, or in a case in which the first pattern is visible in the image during travel of a vehicle.

Additional Note 15

The airbag control method of Additional note 14, wherein deployment of the airbag is prohibited in a case in which a second predetermined period of time or greater continues from when the tongue member provided at the seatbelt engaged with the buckle and the first pattern is not visible in the image.

Additional Note 16

The airbag control method of Additional note 15, wherein the seated passenger is warned in a case in which the second predetermined period of time or greater continues from when the tongue member provided at the seatbelt engaged with the buckle and the first pattern is not visible in the image that is also a case in which a load detected prior to the tongue member being engaged with the buckle as detected by a seating sensor for detecting loads on a seating face of the seat provided with the seatbelt is a load that is less than a threshold value.

Additional Note 17

The airbag control method of Additional note 14, wherein at least one of prohibiting deployment of the airbag or warning the seated passenger is performed in a case in which the first pattern is no longer visible in the image after elapse of a third predetermined period of time or greater from when the tongue member provided at the seatbelt engaged with the buckle, or in a case in which a state of the first pattern not being visible in the image during travel of the vehicle has continued for a fourth predetermined period of time or greater.

Additional Note 18

The airbag control method of Additional note 12, wherein:

a second pattern different from the first pattern is provided at a lower side of the cover; and deployment of the lap belt airbag is prohibited in a case in which the second pattern is visible in the image.

Additional Note 19

The airbag control method of Additional note 13, wherein:

a second pattern different from the first pattern is provided at a rear side of the cover; and deployment of the shoulder belt airbag is prohibited in a case in which the second pattern is visible in the image.

Additional Note 20

The airbag control method of any one of Additional note 11 to Additional note 17, wherein the imaging section is an infrared camera, and the first pattern is a pattern combining a first portion with a second portion having a higher infrared reflectivity than the first portion.

Additional Note 21

An airbag control airbag control program that causes processing to be executed on a computer, the processing including:

determining at least one of propriety of deploying an airbag or propriety of warning a seated passenger according to appearance of a first pattern in an image, captured by an imaging section for capturing a range including a cover having the first pattern provided on at least a front surface side and covering the airbag provided in a packed state at a section of a seatbelt and covering the section of the seatbelt together with the airbag.

Additional Note 22

The airbag control program of Additional note 21, wherein the airbag is a lap belt airbag housed at an upper side of a lap belt section of the seatbelt, the cover is provided so as to cover the airbag and the lap belt section, and the first pattern is provided at an upper side surface of the cover.

Additional Note 23

The airbag control program of Additional note 21, wherein the airbag is a shoulder belt airbag housed at a front side of a shoulder belt section of the seatbelt, the cover is provided so as to cover the airbag and the shoulder belt section, and the first pattern is provided at a front side surface of the cover.

Additional Note 24

The airbag control program of any one of Additional note 21 to Additional note 23, wherein the deployment of the airbag is allowed in a case in which a first predetermined period of time or greater continues from when the tongue member provided at the seatbelt engaged with the buckle and the first pattern is visible in the image, or in a case in which the first pattern is visible in the image during travel of a vehicle.

Additional Note 25

The airbag control program of Additional note 24, wherein deployment of the airbag is prohibited in a case in which a second predetermined period of time or greater continues from when the tongue member provided at the seatbelt engaged with the buckle and the first pattern is not visible in the image.

Additional Note 26

The airbag control program of Additional note 25, wherein the seated passenger is warned in a case in which the second predetermined period of time or greater continues from when the tongue member provided at the seatbelt engaged with the buckle and the first pattern is not visible in the image that is also a case in which a load detected prior to the tongue member being engaged with the buckle as detected by a seating sensor for detecting loads on a seating face of the seat provided with the seatbelt is a load that is less than a threshold value.

Additional Note 27

The airbag control program of Additional note 24, wherein at least one of prohibiting deployment of the airbag or warning the seated passenger is performed in a case in which the first pattern is no longer visible in the image after elapse of a third predetermined period of time or greater from when the tongue member provided at the seatbelt engaged with the buckle, or in a case in which a state of the first pattern not being visible in the image during travel of the vehicle has continued for a fourth predetermined period of time or greater.

Additional Note 28

The airbag control program of Additional note 22, wherein:

a second pattern different from the first pattern is provided at a lower side of the cover; and deployment of the lap belt airbag is prohibited in a case in which the second pattern is visible in the image.

Additional Note 29

The airbag control program of Additional note 23, wherein:

a second pattern different from the first pattern is provided at a rear side of the cover; and deployment of the shoulder belt airbag is prohibited in a case in which the second pattern is visible in the image.

Additional Note 30

The airbag control program of any one of Additional note 21 to Additional note 26, wherein the imaging section is an infrared camera, and the first pattern is a pattern combining a first portion with a second portion having a higher infrared reflectivity than the first portion.

What is claimed is:

1. An airbag control device comprising:

a memory, and a processor coupled to the memory, wherein:

the processor is configured to:

determine at least one of propriety of deploying an airbag or propriety of warning a seated passenger according to appearance of a first pattern in an image, captured of a range including a cover having the first pattern provided on at least a front surface side and covering the airbag provided in a packed state at a section of a seatbelt and covering the section of the seatbelt together with the airbag.

2. The airbag control device of claim 1, wherein the airbag is a lap belt airbag housed at an upper side of a lap belt section in a being-worn state of the seatbelt, the cover is provided so as to cover the airbag and the lap belt section, and the first pattern is provided at an upper side surface of the cover.

3. The airbag control device of claim 1, wherein the airbag is a shoulder belt airbag housed at a front side of a shoulder belt section in a being-worn state of the seatbelt, the cover is provided so as to cover the airbag and the shoulder belt section, and the first pattern is provided at a front side surface of the cover.

4. The airbag control device of claim 1, wherein the processor is configured to allow deployment of the airbag in a case in which a first predetermined period of time or greater continues from when a tongue member provided at the seatbelt engaged with a buckle and the first pattern is visible in the image, or in a case in which the first pattern is visible in the image during travel of a vehicle.

5. The airbag control device of claim 4, wherein the processor is configured to prohibit deployment of the airbag in a case in which a second predetermined period of time or greater continues from when the tongue member provided at the seatbelt engaged with the buckle and the first pattern is not visible in the image.

6. The airbag control device of claim 5, wherein the processor is configured to warn the seated passenger in a case in which the second predetermined period of time or greater continues from when the tongue member provided at the seatbelt engaged with the buckle and the first pattern is not visible in the image that is also a case in which a load detected prior to the tongue member being engaged with the buckle as detected by a seating sensor for detecting loads on a seating face of a seat provided with the seatbelt is a load that is less than a threshold value.

7. The airbag control device of claim 4, wherein the processor is configured to perform at least one of prohibiting deployment of the airbag or warning the seated passenger in a case in which the first pattern is no longer visible in the image after elapse of a third predetermined period of time or greater from when the tongue member provided at the seatbelt engaged with the buckle, or in a case in which a state of the first pattern not being visible in the image during travel of the vehicle has continued for a fourth predetermined period of time or greater.

8. The airbag control device of claim 2, wherein:

a second pattern different from the first pattern is provided at a lower side of the cover; and the processor is configured to prohibit deployment of the lap belt airbag in a case in which the second pattern is visible in the image.

9. The airbag control device of claim 3, wherein:

a second pattern different from the first pattern is provided at a rear side of the cover; and the processor is configured to prohibit deployment of the shoulder belt airbag in a case in which the second pattern is visible in the image.

10. The airbag control device of claim 1, wherein an imaging section that captures the image is an infrared camera, and the first pattern is a pattern combining a first portion with a second portion having a higher infrared reflectivity than the first portion.

11. An airbag control method executed by a processor, the airbag control method comprising:

determining at least one of propriety of deploying an airbag or propriety of warning a seated passenger according to appearance of a first pattern in an image, captured by an imaging section for capturing a range including a cover having the first pattern provided on at least a front surface side and covering the airbag provided in a packed state at a section of a seatbelt and covering the section of the seatbelt together with the airbag.

12. A non-transitory storage medium storing an airbag control program executable by a processor to perform processing comprising:

determining at least one of propriety of deploying an airbag or propriety of warning a seated passenger according to appearance of a first pattern in an image, captured by an imaging section for capturing a range including a cover having the first pattern provided on at least a front surface side and covering the airbag provided in a packed state at a section of a seatbelt and covering the section of the seatbelt together with the airbag.

* * * * *